UNITED STATES PATENT OFFICE.

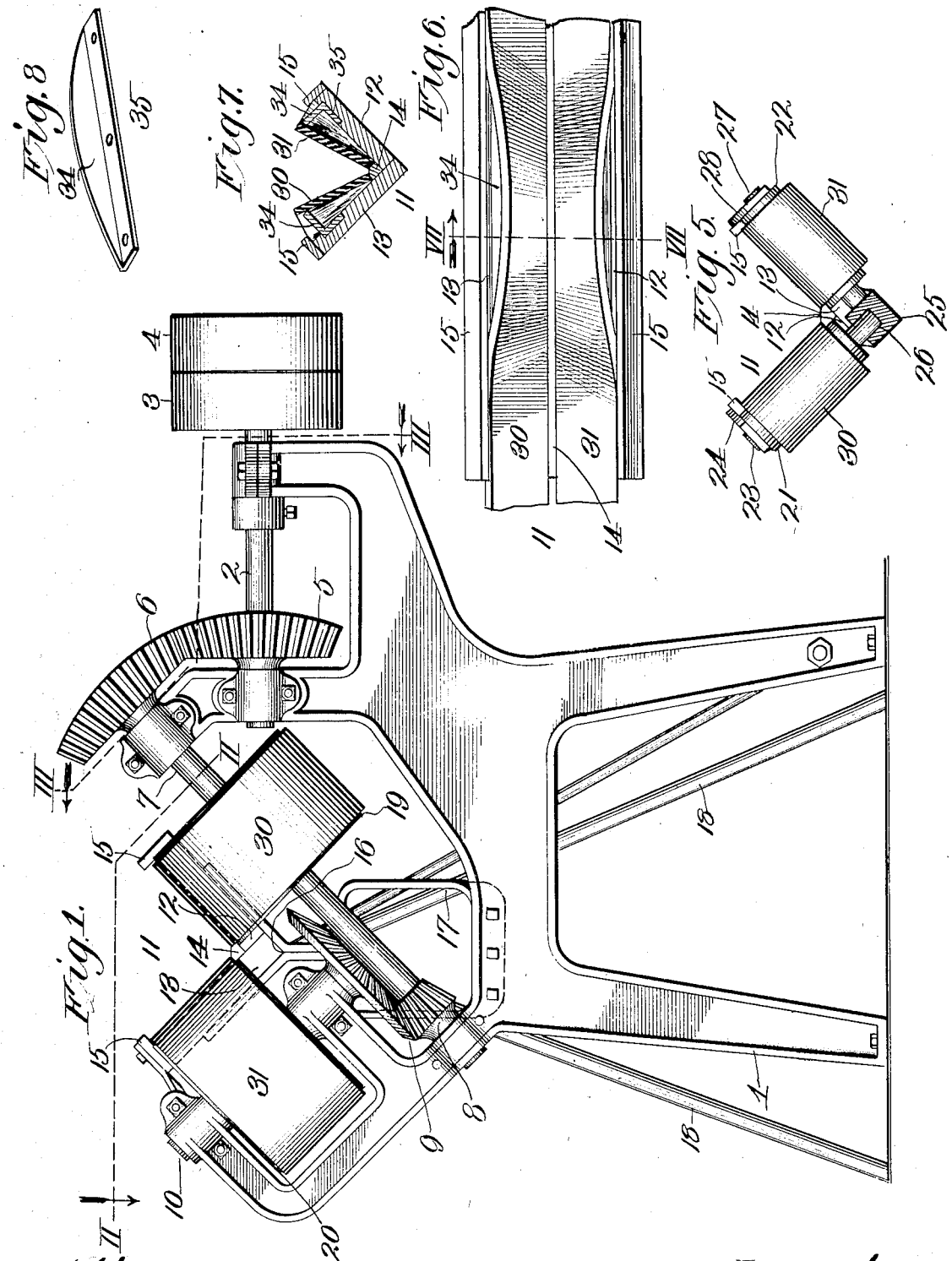

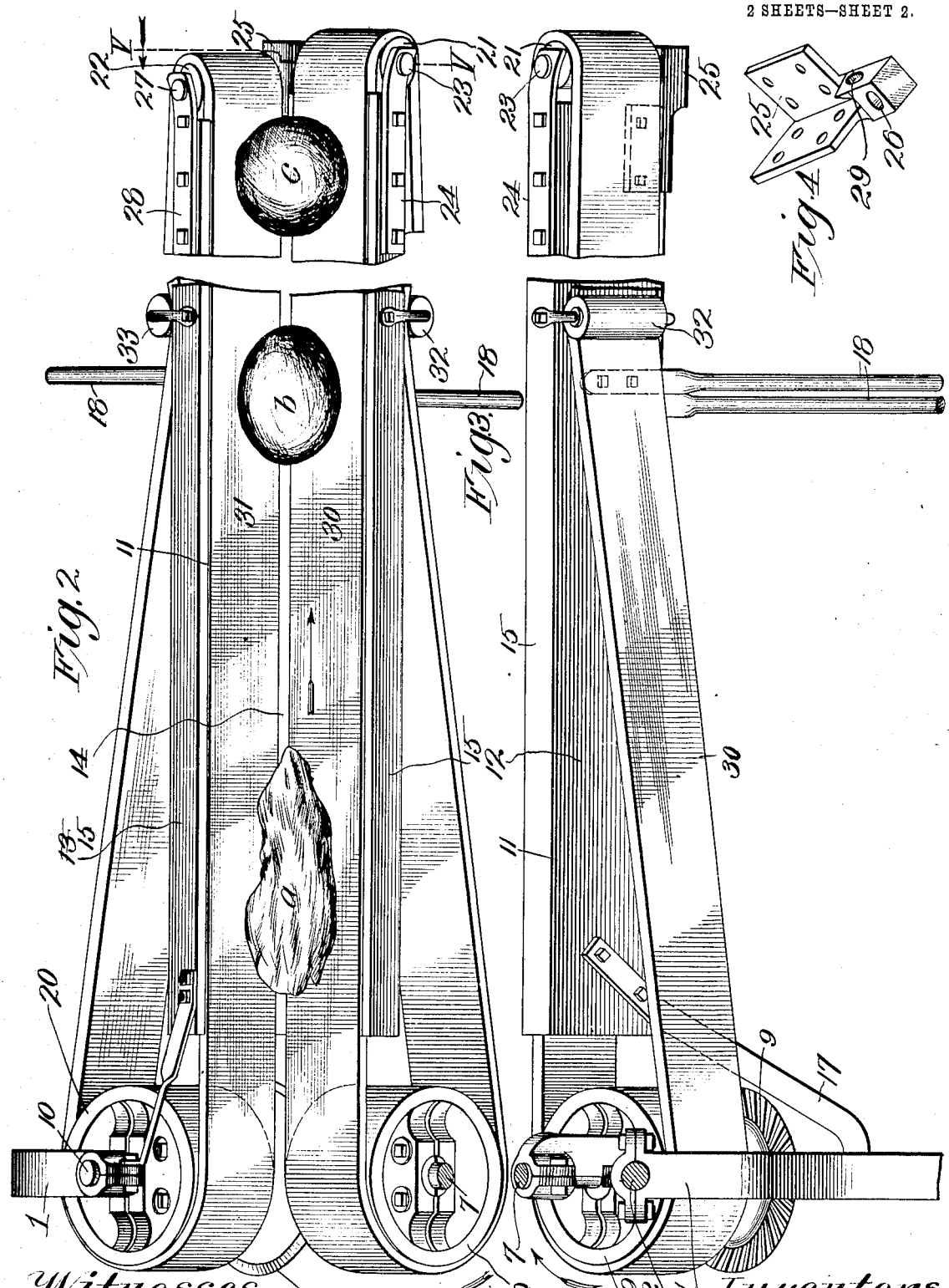

HARRY E. SMITH AND WINFIELD M. CAMPBELL, OF KANSAS CITY, MISSOURI, ASSIGNORS OF ONE-THIRD TO SAID HARRY E. SMITH AND TWO-THIRDS TO B. HOWARD SMITH, OF KANSAS CITY, MISSOURI.

LOAF-MOLDING MACHINE.

No. 892,559. Specification of Letters Patent. Patented July 7, 1908.

Application filed October 6, 1906, Serial No. 337,700. Renewed December 24, 1907. Serial No. 407,943.

*To all whom it may concern:*

Be it known that we, HARRY E. SMITH and WINFIELD M. CAMPBELL, citizens of the United States, residing at Kansas City, in the county of Jackson and State of Missouri, have invented certain new and useful Improvements in Loaf-Molding Machines, of which the following is a specification.

Our invention relates to round loaf molders and our object is to produce a machine for receiving pieces of dough of any shape and simultaneously rounding and conveying them to the pans in which they are to be baked or to a second molding machine to give them an elongated form preliminary to their deposit in pans of substantially corresponding configuration.

A further object is to produce a machine of the character set forth which will efficiently, reliably and expeditiously round pieces of dough so perfectly as to insure the eventual production of loaves of smooth surface and of symmetrical form and attractive appearance.

A still further object is to produce a simple and inexpensive machine which cannot readily get out of repair.

With these objects in view and others of a subordinate character, the invention consists in certain novel and peculiar features of construction and organization as hereinafter described and claimed; and in order that it may be fully understood reference is to be had to the accompanying drawings in which—

Figure 1, is a front end view of a machine embodying our invention. Fig. 2, is a plan view, broken away, and with one of the shafts in section on the line II—II of Fig. 1, and with certain parts omitted. Fig. 3, is an inside view broken away, and with two of the shafts in section on the line III—III of Fig. 1, and with certain parts omitted. Fig. 4, is a detail perspective view of a bearing bracket forming a part of the machine. Fig. 5, is an end view with a part in section on the line V—V of Fig. 2, and omitting the parts in the background. Fig. 6, is a plan view of a part of the machine of slightly modified construction. Fig. 7, is a section on the line VII—VII of Fig. 6. Fig. 8, is a detail perspective view of a part of the structure shown in Figs. 6 and 7.

In the said drawings, 1 indicates a suitable support or standard which is preferably of cast metal and may be bolted or otherwise secured to the floor.

2 indicates a short shaft journaled in said support and equipped with fast and loose pulleys 3 and 4 respectively and with a bevel gear 5, meshing with a similar gear 6 on a shaft 7—disposed by preference at an angle of about forty five degrees to the vertical—journaled in the support 1.

8 indicates a beveled pinion secured on shaft 7 and meshing with a beveled gear 9, on the inner end of the shaft 10 extending at right angles to shaft 7 and preferably in the same vertical plane as the latter, said shaft 10, being also journaled in the support so as to bear a fixed relation with respect to shaft 7.

11 indicates a long trough consisting of a pair of boards 12 and 13 arranged by preference at right angles to each other and provided at their inner angle or junction point with a filling strip 14 and at their upper edges with inwardly projecting flanges 15, which flanges in conjunction with said strip provide channeled inner faces for the trough. The trough at its front end is preferably supported in the crotch 16 of a bracket 17 carried by the support and near its opposite end is mounted upon supporting legs 18, it being understood of course that any suitable means for supporting the trough in a fixed relation to the shafts 7 and 10 may be employed.

19 and 20 indicate large pulleys rigidly secured respectively on shafts 7 and 10 and having the uppermost parts of their peripheries in substantially the same plane as the channeled faces of sides 12 and 13 respectively of the trough.

21 and 22 indicate pulleys arranged at the opposite end of the trough from pulleys 19 and 20 and having the uppermost parts of their peripheries in about the same plane as sides 12 and 13, the shaft 23 of pulley 21 being journaled in a bearing arm 24 secured to the trough and in a socket 26 of a bearing bracket 25 also secured to the trough. The shaft 27 of pulley 22 is likewise journaled in a bearing arm 28 secured to the trough and in a socket 29 in said bearing bracket 25.

30 and 31 indicate endless belts connecting pulleys 19 and 20 and 21 and 22 respectively, the upper strands of said belts fitting snugly in the channeled faces of the trough with their lower edges bearing against the filling strip 14 and their upper edges against or contiguous to the flanges 15 of the trough.

32 and 33 indicate guide rollers for holding the outer strands of the belts close to the trough in order that they may have a greater area of frictional contact with the rollers. Said guide rollers furthermore serve as tension rollers for the belts, though it is to be understood that if necessary any suitable tension device or devices may be employed.

In practice a driven belt, not shown, engaging the pulley 4 will be shifted in any preferred manner onto fast pulley 3 when it is desired to operate the machine, the direction of the belt being such as to drive belt 30 in the direction indicated by the arrow, Fig. 2, and belt 31 in the opposite direction, one of the belts, preferably belt 30, being driven at a greater speed than the other so that when a piece of dough as at $a$, is dropped upon the belts, it will move with belt 30 from the front toward the rear end of the machine at a speed proportionate to the variation in speed between said oppositely moving belts, it being further noted that because of the fact that the belts move in opposite directions they at the same time rotate the piece of dough so that it quickly assumes an elliptical form as shown at $b$ and by the time it reaches the discharge end of the machine is rounded as at $c$, and in such form is discharged, usually on an endless carrier, not shown, leading to a machine for molding the loaves into substantially the form in which they are to appear as baked loaves, it being understood of course that the subsequent form of the rounded loaves is immaterial as far as this invention is concerned.

To compact a stringy piece of dough very quickly, the passage between the belts may be narrowed at the desired point as shown in Figs. 6 and 7, the preferred method of contracting the passage being to interpose between the sides of the troughs and the contiguous portions of the belts, segment-shaped plates 34 provided with flanges 35 through which fastening devices, not shown, may extend to secure the plates in position, the segment shaped plates when arranged directly opposite, causing the belts to bend approximately as indicated most clearly in Fig. 6, and thus cause them, by exerting a greater frictional pressure on the dough, to compact the same more quickly than under ordinary conditions. It will be understood of course that while the preferred construction is that embodying two belts actually moving in opposite directions, one moving belt or surface and a stationary belt or surface will accomplish the object of conveying and rounding the dough. It will also be understood that the same effect can be produced with two belts or surfaces moving the same direction with one moving at a greater speed than the other so as to give a relative opposite movement, and that either of these two last-named types of construction are contemplated as well as other changes which properly fall within its spirit and scope.

Having thus described the invention what we claim as new and desire to secure by Letters Patent, is:—

1. A loaf molding machine, comprising a pair of belts having their inner strands extending in parallel lines and disposed at an angle to each other to form a substantially V-shaped trough between them, and means for causing said belts to travel continuously in opposite directions.

2. A loaf molding machine, comprising a trough consisting of two upwardly diverging parts, means for causing one of said parts to travel continuously in one direction, means to cause the other part to move in the opposite direction at less speed, and a filling strip between the lower or contiguous edges of said parts.

3. A loaf molding machine comprising a trough, a pair of endless belts extending through said trough and having their upper strands substantially parallel with the walls or sides of the troughs and moving in opposite directions at different speeds and a filling strip secured to the trough between the lower or contiguous edges of said strands.

4. In a loaf molding machine, a stationary trough having a filling strip therein at the junction of its sides, upwardly converging flanges at the upper edges of said sides, rollers at opposite ends of each side of the trough, belts connecting said rollers and having their upper strands extending through the trough between said filling strip and said flanges, and means to drive said belts in opposite directions at different speeds.

5. In a loaf molding machine, a stationary trough having a filling strip therein at the junction of its sides, upwardly converging flanges at the upper edges of said sides, rollers at opposite ends of each side of the trough, belts connecting said rollers and having their upper strands extending through the trough between said filling strip and said flanges, intermeshing bevel gears of different diameter secured on the shafts of the rollers at one end of the trough, and means to drive one of said shafts.

6. In a machine of the character described, a substantially V-shaped trough, a filling strip within and at the bottom of the same, endless belts having their upper strands extending through said troughs and traveling in opposite directions at different speeds, and means to contract the passage between said belts by bending one of them toward the other.

7. In a machine of the character described, a substantially V-shaped trough, a filling strip within and at the bottom of the same, endless belts having their upper strands extending through said troughs and traveling in opposite directions at different speeds, and a pair of segment shaped plates secured in the trough and converging upward therefrom and causing the belts to bend up toward each other and contract the passage between them.

In testimony whereof we affix our signatures, in the presence of two witnesses.

HARRY E. SMITH.
WINFIELD M. CAMPBELL.

Witnesses:
H. C. RODGERS,
G. Y. THORPE.